US007570621B2

(12) United States Patent
Garg

(10) Patent No.: US 7,570,621 B2
(45) Date of Patent: Aug. 4, 2009

(54) METHOD AND APPARATUS FOR REDUCING ERRONEOUS FRAME CLASSIFICATIONS

(75) Inventor: Sanjeev Garg, ArlingtonHeights, IL (US)

(73) Assignee: Motorola, Inc., Schaumburg, IL (US)

( * ) Notice: Subject to any disclaimer, the term of this patent is extended or adjusted under 35 U.S.C. 154(b) by 690 days.

(21) Appl. No.: 10/814,465

(22) Filed: Mar. 31, 2004

(65) Prior Publication Data
US 2005/0220058 A1      Oct. 6, 2005

(51) Int. Cl.
    H04B 7/216        (2006.01)
(52) U.S. Cl. ................... 370/335; 370/342; 370/337; 455/452; 455/522; 455/69
(58) Field of Classification Search ........... 370/335; 455/452, 522, 69
    See application file for complete search history.

(56) References Cited

U.S. PATENT DOCUMENTS

| | | | | |
|---|---|---|---|---|
| 5,673,266 A | * | 9/1997 | Li ................ | 370/465 |
| 5,960,352 A | * | 9/1999 | Cherpantier ........ | 455/451 |
| 6,148,208 A | * | 11/2000 | Love ............... | 455/442 |
| 6,330,462 B1 | * | 12/2001 | Chen ............... | 455/572 |
| 6,490,268 B1 | * | 12/2002 | Lee et al. .......... | 370/342 |
| 6,507,572 B1 | * | 1/2003 | Kumar et al. ....... | 370/335 |
| 6,631,126 B1 | * | 10/2003 | Berliner et al. ..... | 370/342 |
| 6,891,815 B1 | * | 5/2005 | Song ............... | 370/335 |
| 6,901,268 B2 | * | 5/2005 | Chang .............. | 455/522 |
| 6,996,069 B2 | * | 2/2006 | Willenegger ........ | 370/252 |
| 7,376,102 B2 | * | 5/2008 | Shahidi et al. ..... | 370/331 |
| 2001/0024431 A1 | * | 9/2001 | Koo et al. ......... | 370/335 |
| 2001/0046878 A1 | * | 11/2001 | Chang .............. | 455/522 |
| 2002/0085622 A1 | * | 7/2002 | Dhar et al. ........ | 375/132 |
| 2002/0086692 A1 | * | 7/2002 | Chheda et al. ...... | 455/522 |
| 2002/0136187 A1 | * | 9/2002 | Aoyama et al. ...... | 370/342 |
| 2002/0147020 A1 | * | 10/2002 | Iguchi et al. ...... | 455/452 |
| 2002/0160782 A1 | * | 10/2002 | Joshi et al. ....... | 455/452 |
| 2003/0117956 A1 | * | 6/2003 | Lee ................ | 370/232 |
| 2003/0169707 A1 | * | 9/2003 | Usuda et al. ....... | 370/334 |

\* cited by examiner

Primary Examiner—Lester Kincaid
Assistant Examiner—Diego Herrera

(57) ABSTRACT

A method, and an apparatus in, for example, a mobile station (MS) (201) or a base station (202) reduces erroneous frame classifications in a radio access network (RAN). An interface (223) couples to the RAN supporting a downlink on a first channel (231) with a first data rate and a second channel (230) with a lesser second data rate. A memory (221) and a processor (200) store and execute instructions to determine a parameter associated with a received frame (301) and determine that a classification condition, such as DTX or Erasure, associated with the frame on one channel (231) is erroneous based on a parameter associated with a frame (304) on the other channel (230). The classification condition is reclassified based on the parameter on the other channel and a power level adjustment CAN BE facilitated. The channels include a high capacity channel and a low capacity channel such as a supplemental channel (SCH), fundamental channel (FCH) or dedicated control channel (DCCH) in a cdma2000 RAN.

24 Claims, 4 Drawing Sheets

METHOD AND APPARATUS FOR REDUCING ERRONEOUS FRAME CLASSIFICATIONS

FIELD OF THE INVENTION

The present invention relates in general to communications associated with radio access networks (RANs), and devices such as mobile receivers, transceivers, base units, and related equipment, and more specifically to a method and apparatus for determining erroneous frame classifications.

BACKGROUND OF THE INVENTION

Next generation mobile systems and services typically referred to as Third Generation or 3G systems and services, are now coming on-line. 3G mobile technology provides better quality voice, Internet, and related multimedia services. The International Telecommunication Union (ITU) has worked with industry bodies to define and approve technical requirements, standards, and spectrum allocation for 3G systems under the IMT-2000 (International Telecommunication Union-2000) and related programs.

CDMA2000 is a 3G system which has evolved from existing wireless standards, for example, IS-95, and which allows wireless operators to provide enhanced service in an environment characterized by new market dynamics associated with increased mobility, mobility enhancing equipment, and wireless access to the Internet. CDMA2000 specifies both an air interface and a core network technology for delivering improved levels of service demanded by increasingly mobile customers.

It will be appreciated that in accordance with various common communication architectures, CMDA2000 systems include layers within, for example, the seven layer protocol stack commonly understood by those of ordinary skill in the art as the Open Systems Interconnect (OSI) model. One such layer of the OSI stack architecture present within CMDA2000 systems is the Physical Layer where in an exemplary receiver, signals are received, despread, demodulated, decoded, channelized, framed and the like. As information is decoded and channelized, frames are constructed or re-constructed in accordance with relevant standards. Remaining layers in ascending order within the typical layered architecture include MAC Layer, Security Layer, Connection Layer, Session Layer, Stream Layer, and Application Layer. An exemplary CDMA2000 system may further operate in both single carrier and multiple carrier environments and according to both Frequency Division Duplexing (FDD) and Time Division Duplexing (TDD).

Physical layer channels are implementation independent and may be prefixed with an "R" standing for an uplink or Reverse link channel portion extending from a Mobile Station (MS) to a Base Station within a RAN, while "F" denotes a downlink or Forward link channel portion extending from the Base Station to the MS. For simplicity, prefixes will not be used herein and instead reference is made to channels by name only. It should further be noted that reference to a channel generally refers to the combination of a forward and a reverse portion thereof, although generally only one channel portion such as a forward portion or a reverse portion is discussed at one time.

Physical channels may be classified as dedicated and common channels. For example, a Dedicated Physical Channel (DPCH) offers a point-to-point connection while a Common Physical Channel (CPCH) offers a point-to-multipoint access. Within a typical CDMA2000 system, many channel types are available and have been listed and described briefly hereinafter. A typical CDMA2000 system provides a Dedicated Physical Channel (DHCH); a Fundamental Channel (FCH) for transporting dedicated data; a Supplemental Channel (SCH) for meeting required data rates through dynamic allocation; a Dedicated Control Channel (DCCH) for transporting mobile-specific control information; and a Dedicated Auxiliary Pilot Channel (DAPICH) optionally used with antenna beam-forming and beam-steering techniques to increase the coverage or data rate towards a particular user. As previously noted, the above described channels are available on both the forward and reverse channels. Additional channels are specific to forward or reverse channels as noted hereinafter. A Pilot Channel (R-PICH) provides capabilities associated with coherent detection; a Forward Pilot Channel (F-PICH) provides soft handoff and coherent detection capabilities; a Forward Common Auxiliary Pilot Channel (F-CAPICH) provides soft handoff and coherent detection capabilities; a Forward Paging Channel (F-PCH) provides paging functions using short burst data communications; a Forward Common Control Channel (F-CCCH) provides paging functions supporting different data rates and a capability for short burst data communications; a Forward Sync Channel (F-SYNC) provides an MS with system information and synchronization; a Reverse Access Channel (R-ACH) provides a multiple access channel where a MS can communicate messages to the base station; and a Reverse Common Control Channel (R-CCCH) which is similar to the R-ACH but is configured to transport control information.

Two channels of interest in a typical communication between a MS and a base station or other station or node within a RAN, include the SCH and the FCH/DCCH. As noted above, the FCH may be used for transporting dedicated data and the DCCH is used for transporting mobile-specific control information. Both the FCH and DCCH are characterized as high-reliability low data rate channels, while the SCH is used for meeting required data rates through dynamic allocation and is characterized as a low reliability high data rate channel. By reliability, reference is made to the degree of signaling accuracy associated with each channel. SCH channels by design are geared toward carrying large volumes of traffic with less concern for accuracy.

Problems arise however in that frame classifications, such as whether a transmission is present, e.g. a continuous/discontinuous transmission (TX/DTX) classification and Rate determination algorithms operate independently on each channel. Further, TX/DTX classifications are used for power control and Radio Link Protocol (RLP) purposes, thus accurate classification has significant ramifications throughout the RAN. Since the SCH is a low reliability channel, capacity may be sacrificed when rate determinations made for the SCH channel are erroneous. Typically, since the SCH channel is used for high capacity high data rate data transfers associated with traffic which may have data components being transferred on other channels, errors in the rate determination for the SCH channel, or any channel, may reduce throughput, power efficiency, bandwidth utilization, and the like, and thus may have an overall negative impact throughout the system. For example, power increases resulting from improper channel classifications can result in increases in co-channel interference. Conversely, data loss which can also be associated with improper classification can disrupt protocol operation, error correction, data recovery and the like. It would be desirable therefore to increase the accuracy of frame classifications so that overall RAN performance can be improved.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

Figure 1:
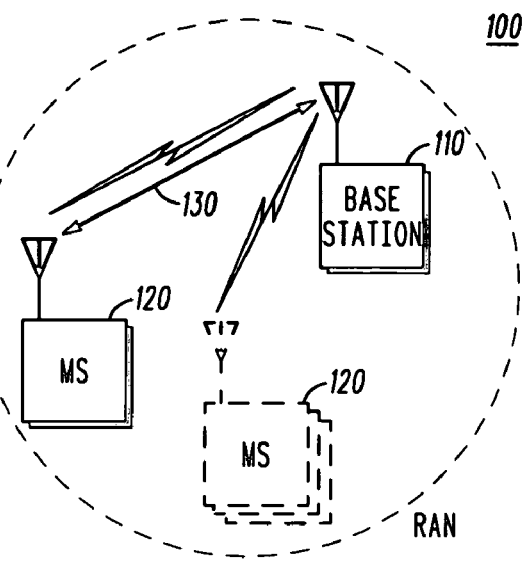
FIG. 1 is a block diagram depicting an exemplary Radio Access Network (RAN)

In overview, the present disclosure concerns the classification of frames received in connection with a communication conducted between devices in a Radio Access Network (RAN), such as a CDMA2000 RAN. The classification preferably takes place in a receiver or receiver section of a transceiver which may be located in a communication device such as a Mobile Station (MS) or Base Station (BS) located in the RAN. As will be appreciated, the MS may include a communication device such as a stationary or fixed mobile receiver, a moving mobile receiver, a stationary or moving communications unit, terminal, handset, or the like, and the BS may include a fixed base station, or the like. As signals associated with transmitted information are received, demodulated, despread, decoded and the like by the physical layer hardware of the receiver, certain assumptions or classifications can be made about the recovered data. For example, if it appears that no signal is present, a discontinuous transmission (DTX) condition can be assigned. If it appears that data should have been present but is not, an erasure condition can be assigned to the associated frame. Classification information may be passed upstream to high layer protocol layers. The classification may take place on, e.g. have an impact on various channels such as supplementary channels, control channels, traffic channels or the like. Transmit power levels associated with transmission of signals on the corresponding portion of the channel may be adjusted based on the classification, re-classification, or the like using power control channels which allow information to be received by a transmitter associated with power control. Accordingly in an exemplary receiver, a classification associated with one channel may be forcefully modified based on a corresponding classification of a co-channel and the adjustment of a power level may be facilitated as will be described in greater detail hereinafter in situations where the initial classification on the one channel is erroneous.

Thus, the present invention is directed to a method and apparatus for reducing such erroneous classifications. It should be noted that in accordance with conventional methods, latency is a primary issue of importance. Deterministic and quasi-deterministic methods such as that described in U.S. patent application No. US20020086692 which rely on monitoring and a post-hoc analysis of, for example, frame quality metrics require post reception frame processing to determine whether metrics are met. If not, further determinations are made as to whether erroneous frame classifications are present. In still other systems, such as that described in U.S. patent application No. 20020160782, likely initial data rates are determined for each demodulated and decoded frame. The likely data rates are correlated with each other and with a relevant protocol standard and a maximum likelihood combination of rates. In these and other conventional systems, the latency which accompanies such processing limits the usefulness of erroneous condition determinations since the delay inhibits real time or near real time adjustments to system parameters such as transmit power which would lead to even greater gains in the efficient use of the channel or channels and of the system as a whole. Furthermore these earlier approaches do not differentiate between TX/DTX and Erasures.

It will be appreciated that classifying received frames and otherwise processing received signals or collections of received signals or data, as noted above, may be performed in a receiver or a receiver section of transceiver in a communication device, such as a handset, terminal, base station, or the like. The receiver in the communication device may further have a dedicated processor, or the communication device may be equipped with a general purpose processor coupled to an analog processing circuit or analog "front-end" with appropriate software for performing a receiver function, an application specific integrated circuit (ASIC), a digital signal processor (DSP), or the like, or various combinations thereof, as would be appreciated by one of ordinary skill as necessary to carry out various aspects of the invention. Memory devices, as would be known to one of ordinary skill, may further be provisioned with routines and algorithms for performing classification of received frames, detection of erroneous operating conditions, and re-classification of received frames associated with, for example, reducing noise and interference, and otherwise appropriately handling the input data.

It will further be appreciated that communications devices may further refer to subscriber devices such as cellular or mobile phones, two-way radios, messaging devices, personal digital assistants, personal assignment pads, personal computers equipped for wireless operation, a cellular handset or device, or the like, or equivalents thereof provided such units are arranged and constructed for operation in accordance with the various inventive concepts and principles embodied in exemplary receivers, and methods for determining erroneous frame classifications, such as an erasure condition when a DTX condition should apply, as discussed and described herein.

The principles and concepts discussed and described may be particularly applicable to receivers and associated access terminals, communication units, devices, and systems providing or facilitating voice communications, data transfer, or messaging services over RANs operating in accordance with various standards such as CDMA (code division multiple access) and variants thereof, GSM (Global System for Mobile communications), GPRS (General Packet Radio System), 3G systems such as UMTS (Universal Mobile Telecommunication Service) systems, integrated digital enhanced networks and variants or evolutions thereof. Principles and concepts described herein may further be applied in devices or systems with short range communications capability normally referred to as W-LAN capabilities, such as IEEE 802.11, Bluetooth, or Hiper-LAN and the like that preferably utilize CDMA, frequency hopping, orthogonal frequency division multiplexing, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

As described in greater detail hereinafter, various inventive principles are employed to reduce or eliminate erroneous frame classification in RAN channels associated with a receiver and further to provide increased RAN efficiency by allowing power levels to be more accurately controlled based on frame reclassification. Further, the inventive principals disclosed and described herein may be used to further improve performance when used in reverse, for example, by forcefully re-classifying a second channel, such as a high-reliability channel based on the classification associated with a first channel, such as a low-reliability channel.

In accordance with various exemplary and alternative exemplary embodiments, a method is provided for reducing an erroneous frame classification associated with a communication in a radio access network (RAN). A first frame associated with the communication on a first channel having a first data rate and a second frame associated with the communication on a second channel having a second data rate are preferably classified, for example, according to whether a transmission is present or not—transmit/discontinuous transmit (TX/DTX) condition. Note that the TX/DTX condition may alternatively be referred to as transmission/discontinuous transmission conditions. It will be appreciated that such a classification can be made once the frame is demodulated and decoded by physical layer hardware and software. The first frame may be re-classified from a first condition of the first frame, such as an erasure condition associated with the first frame, to a second condition of the first frame, such as a DTX condition, based on the classification of the second frame. It should be noted that the first data rate channel can have a relatively higher data rate than the second data rate channel. The second frame may also be reclassified from a first condition of the second frame, such as an erasure condition associated with the second frame, to a second condition of the second frame, such as a DTX condition, associated with the communication based on the classification of the first frame. It should be noted that, in accordance with various exemplary embodiments, the first channel preferably includes a high capacity, possibly lower reliability traffic channel such as a supplemental channel (SCH), and the second channel includes a low capacity, high reliability channel such as a control or signaling channel including a fundamental channel (FCH) or a dedicated control channel (DCCH) as would be known to be associated with CDMA architecture including cdma2000 or the like.

When classifying the first frame and the second frame respectively, several hierarchical procedures may be used including classifying each of the first frame and the second frame respectively according to a transmit/discontinuous transmit (TX/DTX) condition. Next, frame rate parameters may be determined, and then frame quality. When the TX/DTX classification is erroneous, such as when a channel is erroneously determined to be in a TX condition, further misclassification can occur. Thus, as described above, the first condition preferably includes an erasure condition which is erroneous, and the second condition includes a discontinuous transmission (DTX) condition which is the proper condition for a channel with no active transmission. When reclassification is performed, the receiver may be configured to facilitate an adjustment in a power control level associated with the first channel and possibly other channels within the system, based on the re-classification thereof.

In accordance with still other exemplary and alternative exemplary embodiments, an erroneous condition in a wireless communication can be determined by, for example, determining a first rate parameter such as a full rate, half rate, quarter rate, eighth rate, and the like, associated with a first frame received on a first channel having a first data rate and a second rate parameter associated with a second frame received on a second channel having a second data rate where the second data rate can be less than the first data rate. A determination can further be made that a first condition associated with the first channel includes the erroneous condition and, as a result, the first condition can be re-classified to a second condition based on, for example, the value associated with the second rate parameter. A determination can further be made that a first condition associated with the second channel includes the erroneous condition and reclassifying the first condition associated with the second channel to a second condition based on the first rate parameter can be performed. As noted above, particularly when associated with a CDMA system such as a cdma2000 system, the first channel for example includes high capacity, possibly lower reliability traffic channels such as a supplemental channel (SCH) and the second channel includes a low capacity high reliability signaling channel such as a fundamental channel (FCH) or a dedicated control channel (DCCH). Accordingly, when reclassifying the first condition on the first channel, the second parameter is preferably used and includes a full rate parameter associated with one of the fundamental channel (FCH) and the dedicated control channel (DCCH). When reclassifying the first condition on the second channel, the first rate parameter is used in some embodiments and includes a full rate parameter associated with the supplemental channel (SCH). To attain greater efficiency in the system, the exemplary receiver may facilitate the adjusting of a power control level, for example, associated with transmission on the first channel and the second channel based on the re-classification of the first condition on the first channel and the second channel.

In accordance with still other exemplary and alternative exemplary embodiments, an apparatus is preferably provided either in a base station (BS) or like fixed station or mobile station (MS) or like access terminal for reducing erroneous frame classifications associated with a communication in a radio access network (RAN). The exemplary apparatus may include an interface such as a standard compliant or proprietary air interface capable of coupling the MS or access terminal and the RAN and supporting a downlink portion of the communication or coupling the base station to the MS and the RAN and supporting an uplink portion on at least a first channel and a second channel. As would be appreciated by one of ordinary skill the apparatus preferably includes a memory and a processor both of which are coupled to the interface through a mechanism such as a bus or the like. The memory preferably stores instructions such as software programs containing routines and the like, which in turn can be executed and, during execution, can cause the processor to determine a second parameter associated with a first frame on the second channel and thereby determine that a first classification condition associated with a first frame on the first channel is erroneous. It should be noted that the first classification condition associated with the first frame on the first channel is reclassified to a second classification condition based on the second parameter and, for example, an adjustment of power control level associated with the first channel can be facilitated based on the re-classification. The instructions can further cause the processor to determine a first parameter associated with the first channel and determine that a first classification condition, such as an erasure condition, associated with the first frame of the second channel is erroneous leading to a reclassification of the first classification condition associated with the first frame of the second channel to a second condition such as a DTX condition based on the first parameter. An adjustment of the power level associated with the second channel is facilitated based on the re-classification. It will be appreciated by one of ordinary skill in the art that efficiency gains can be realized when the first channel includes a high capacity channel and the second channel includes a low capacity channel, for example, when the first channel includes a high capacity low reliability traffic channel such as a supplemental channel (SCH) and when the second channel includes a low capacity high reliability control or signaling channel such as a fundamental channel (FCH) or a dedicated control channel (DCCH).

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as processors and application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1, exemplary diagram 100 is shown including a radio access network (RAN) with a base station (BS) 110 and a mobile station (MS) 120 with a wireless connection 130 facilitated by, for example, an air interface that may be established by adhering to a wireless air interface standard such as the air interface standard described in connection with cdma2000, an example of which can be found in Version 2.0 of Third Generation Partnership Project 2 (3GPP2) document C.S0024 entitled "cdma2000 High Rate Data Air Interface Specification" dated Oct. 27, 2000. It will also be appreciated that the connection may be established using a proprietary air interface specification or protocol. Also shown in FIG. 1 are several additional MS 120s which may typically be present, for example, in a multi-user RAN.

Figure 2:
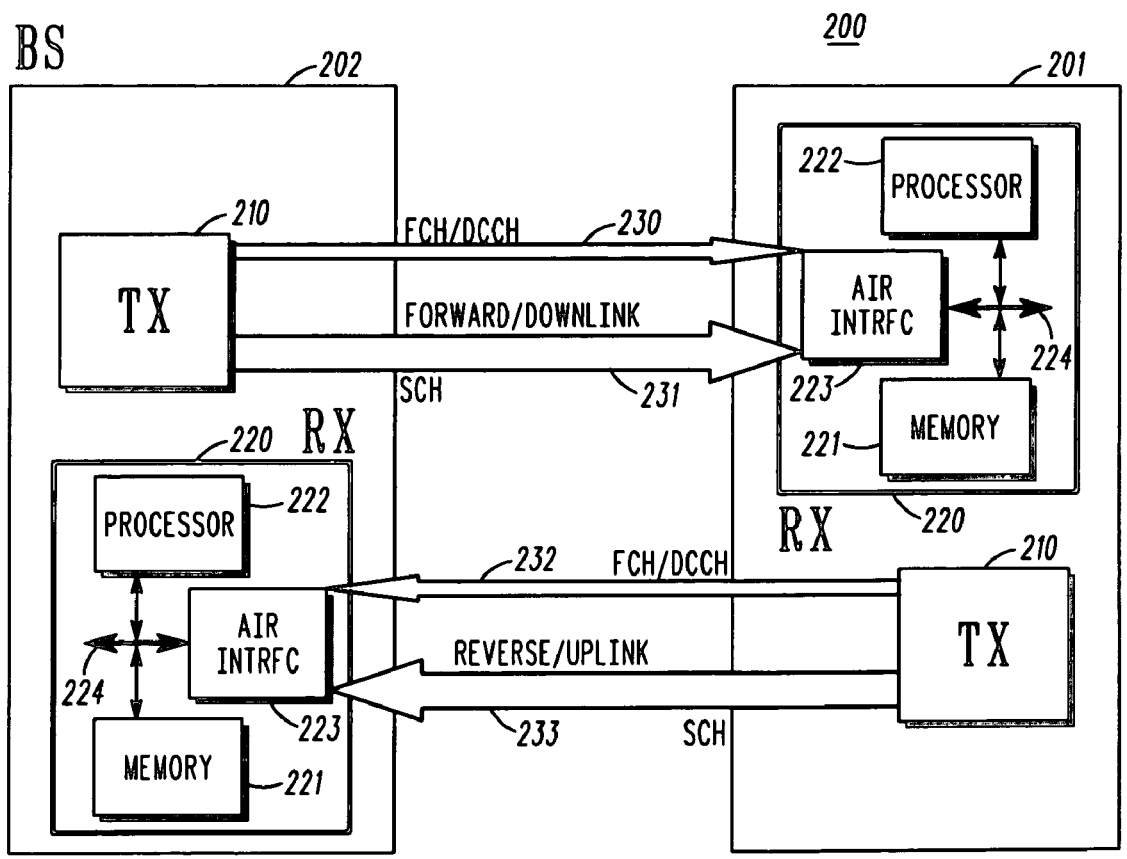
FIG. 2 is a block diagram depicting Mobile Station (MS) and Base Station (BS) components of an exemplary RAN with exemplary Forward and Reverse channel groups.

In accordance with various exemplary embodiments, frame classification may be performed in a receiver of a communication device as shown in exemplary block diagram 200 illustrated in FIG. 2. MS 201 and BS 202 are both equipped with a transmit section 210 and a receive section 220. It will be appreciated that receive section 220 in MS 201 is configured to receive a forward or downlink portion of a first channel 230 and a second channel 231 while receive section 220 in BS 202 is configured to receive a reverse or uplink portion of a first channel 232 and a second channel 233. Corresponding transmit sections 210 are configured to transmit data on first channels 230 and 232 and on second channels 231 and 233 according to relevant protocol standards. Note that this transmitted data can include power level control data for adjusting transmitter power levels on reverse portions of channels as is known. Thus receiver sections 220 can affect transmit power by sending relevant information back via an associated transmitter section 210 on a Power Control Channel or the like, in accordance with an exemplary Physical Layer Protocol as would be included in the cdma2000 specification or a like specification under which an exemplary RAN is configured to operate. To better appreciate certain advantages associated with various embodiments, it should be noted that first channels 230 and 232 are preferably relatively low data rate and thus low capacity channels associated with, for example traffic, signaling and control, such as a Fundamental Channel (FCH) or a Dedicated Control Channel (DCCH) specified in cdma2000. Second channels 231 and 233 preferably include relatively high data rate and thus high capacity channels associated with, for example, high speed data transfer, such as Supplemental Channel (SCH) specified in cdma2000. Each of receiver sections 220 further includes memory 221, processor 222, air interface 223 all connected via bus 224. Instructions may be stored in memory 221 for being executed on processor 222 and through interaction with, for example, air interface 223, may carry out procedures associated with frame classifications and the like described herein in connection with various exemplary embodiments. Exemplary procedures which are not discussed in detail herein and which are assumed to be known to one of ordinary skill in the art include demodulation, decoding, and the like for the purposes of information recovery, error correction, and the building of frames in accordance with relevant standards and, in particular, physical layer portions thereof. It will be assumed that regardless of the exact demodulation methods, air interface 223 will deliver standard compliant frames with indicators associated with erasure and rate whereupon exemplary procedures associated with the present invention can be invoked to further refine frame classifications which may be performed at the physical layer.

While independent channel classification functions are typically integrated into, for example, chipsets used in connection with the additional functions of power control and higher layer functions such as Radio Link Protocol (RLP) related functions, certain combinations of channels and modulation techniques of channel data can cause radical increases in misclassifications. Misclassifications can fall into several categories and are typically expressed as probabilities. For example, P(D|G) can refer to the probability of a DTX classification when a good frame is being transmitted, P(D|E) can refer to the probability of a DTX classification when a bad frame (erasure) is being transmitted, and P(E|D) can refer to the probability of an erasure classification when a DTX condition exists. In a typical system, P(D|E) is relatively high, up to as much as 0.85, which is an 85% probability of an erroneous classification of a frame erasure into a DTX condition. It should be noted that the misclassification associated with P(D|E) can have the most detrimental consequences to the operation of the RAN since data can be lost leading to a host of problems including disruption of the RLP. Operation in accordance with the present invention has been shown to reduce P(D|E) to a negligible level, from 0.0 to 0.01 or 1% probability of an erroneous classification of a frame erasure into a DTX frame with little or no increase in P(E|D).

Figure 3:
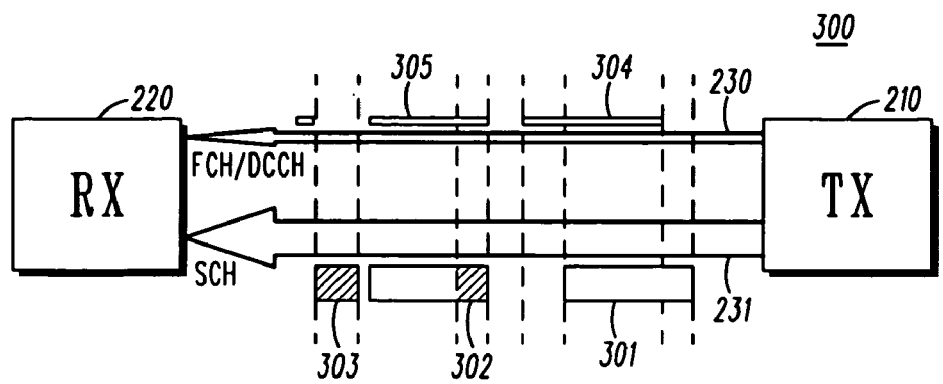
FIG. 3 is a diagram depicting exemplary frame classification associated with a receiver and various exemplary channels such as a supplemental channel (SCH) and a fundamental channel/dedicated control channel (FCH/DCCH)

To better understand the operation of exemplary frame classification and the resulting benefits, reference is made to the diagram 300 of FIG. 3. Exemplary transmitter section 210 may be a transmitter portion of an access terminal or the like or a base station terminal or the like, and is configured during a RAN access session to transfer data to receiver section 220 of, for example, an access terminal or the like as noted above. Channel 230, which is shown as an FCH/DCCH channel as described herein above, can carry normal traffic or signaling in frames 304 and 305. Channel 231, which is shown as a Supplemental channel (SCH) also as described herein above, carries high rate data to supplement traffic on channel 230 in, for example, frame 301. For illustrative purposes, the span between transmitter 210 and receiver 220 can be viewed as a corresponding time span with various frame intervals represented by vertical lines. As can be seen, traffic, such as frame 305, is being transferred on channel 230. In the same temporal vicinity, frame 302 is being transferred on channel 231. The cross hatching portion of frame 302 shows an area where a misclassification could occur if, for example, classification associated with a DTX condition is made. More specifically, when classifying the transmit condition of channel 230 in the temporal vicinity of frame 305, a TX condition should result since traffic is being transmitted. Thus, based on co-channel likelihood principals to be discussed in greater detail hereinafter, if the condition of frame 302 on channel 231 is independently classified as a DTX condition, a classification error is likely since there is an inconsistency with the classification in a higher reliability channel such as channel 230. In accordance with various exemplary embodiments, the condition of frame 302 should be reclassified as an erasure since there is a stronger likelihood that data was being transferred at that time interval on channel 231 based on the classification condition of frame 305 on channel 230, the co-channel. It will be appreciated that the misclassification of a DTX frame to an erasure frame associated with a TX condition results in increases in transmit power levels as a receiver attempts to recover a frame that does not exist. The resulting transmit power increases lead to increased co-channel interference and inefficient power utilization. While the above reclassification case, from DTX to erasure, provides benefits in operating efficiency of an exemplary RAN, a similar approach in a related situation may be used to provide further benefits.

If there is no traffic on channel 230, the resulting frame classification will be DTX indicating that there is no transmission underway. On channel 231, if the independent classification of the condition of frame 303 is, for example, an erasure, a classification error is likely since there is an inconsistency with the classification in the higher reliability channel such as channel 230. Thus, in accordance with various exemplary embodiments, frame 303 should be reclassified from erasure to DTX since no data is being transmitted on channel 230, the co-channel. It will be appreciated that misclassification of frame erasures occurring on active TX channels as DTX frames indicating no transmission, can cause severe problems with power control adaptation and relevant radio link protocol conformity.

Figure 4:
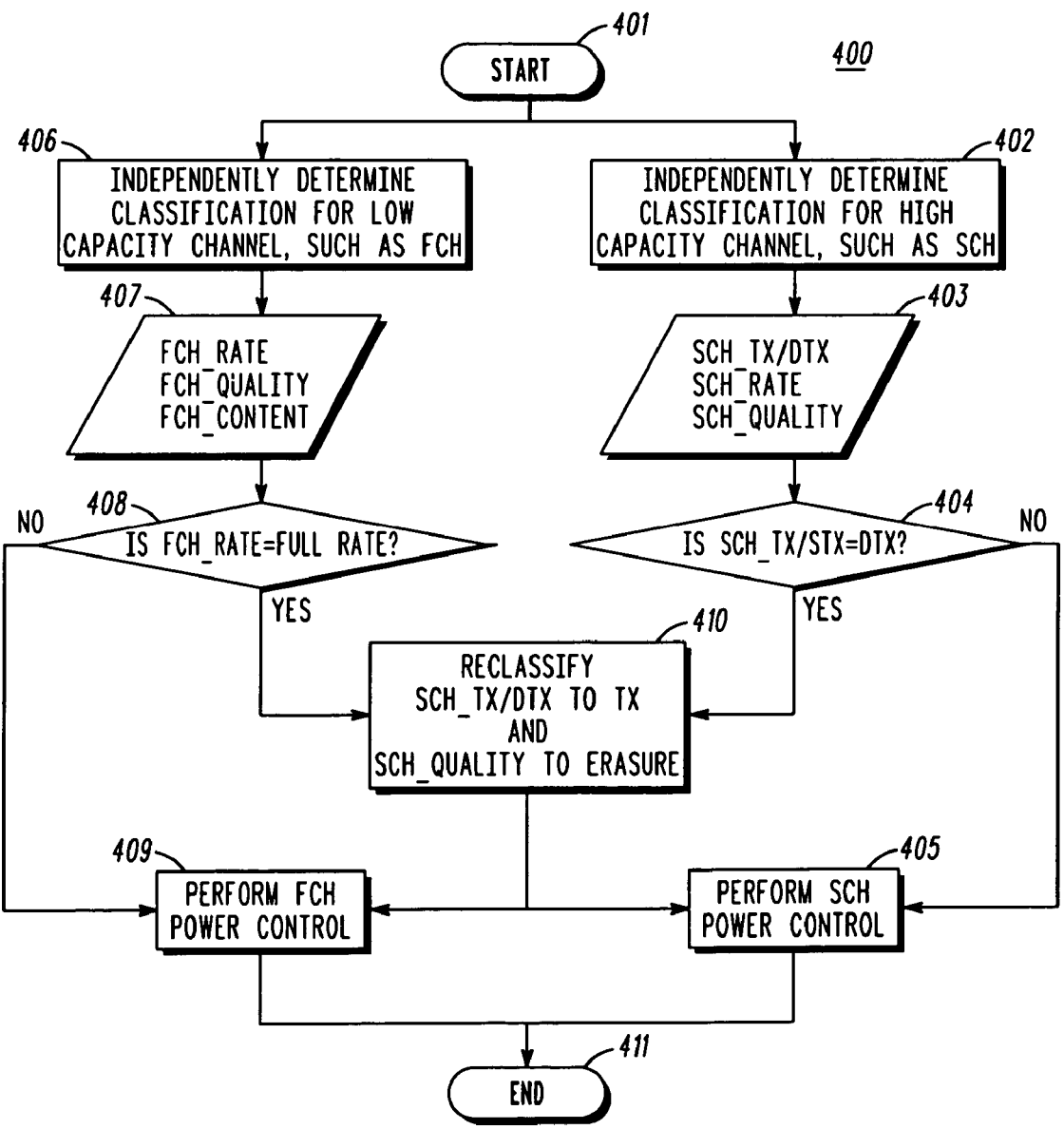
FIG. 4 is a flow chart depicting an exemplary frame classification method in accordance with one embodiment.

An exemplary procedure for reclassification of frames associated with, for example, a high capacity channel such as an SCH channel is illustrated in FIG. 4. Exemplary method 400 starts at 401 where a high capacity channel and a low capacity channel such as a FCH are handled independently. At 402, for example, classifications for the high capacity channel are determined. In 403, information associated with the variables SCH_TX/DTX, SCH_Rate, and SCH_Quality, as determined at 402, are stored. Note that SCH_TX/DTX, SCH_Rate, and SCH_Quality refer to the supplemental channel, respectively, to classifications for the current frame of TX/DTX condition as either TX or DTX, the frame rate as one of the possible frame rates ranging from a highest to lowest rate (for cdma2000 systems either full, half, quarter, or eighth rate frames are possible), and the Quality variable is a binary value indicating a good frame or a bad frame (erasure). The good frame and bad frame typically indicate that, respectively, there is a high level of confidence in the frame or a low level of confidence in the frame. Various known algorithms are used to make the binary quality assessment and these algorithms typically consider the results of channel error coding techniques or resultant metrics with an erasure or bad frame indicating that the error coding algorithm was not able to provide a valid frame. Other attributes typically relying on some assessment of signal to noise or signal to interference (Ec/Io=energy per chip divided by nominal interference) or the aforementioned decoding metrics can be used to provide gradations of quality. As suggested above, Quality may be viewed as an indication of confidence in the frame that results from the decoding. Thus an erasure indicates a low quality frame or frame where the confidence in the frame is low or perhaps near zero.

A test is performed at 404 to determine whether the frame classification variable on the high capacity channel, SCH_TX/DTX indicates a classification of DTX. If not, power control is immediately performed at 405 in the usual manner. If variable SCH_TX/DTX does indicate a classification of DTX, then a reclassification can occur at 410. It should be noted that reclassification, for example, at 410 can make use of one or more co-channel parameters if available, in the form of additional results of a parallel processing path which will be discussed immediately hereinafter. At 406, the classification for a low capacity channel, such as an FCH, can be independently determined. At 407, information associated with FCH_Rate, FCH_Quality, and FCH_Content, as determined at 406, can be stored. Note that these variables or parameters correspond to the fundamental channel and are analogous to the variables noted above. The additional variable, FCH_Content, designates content of the present frame on the FCH and generally indicates bearer or payload data or signaling data. Also note that the FCH is always TX so the TX/DTX variable is not shown, however if this second or low capacity channel was a DCCH the variable DCCH_TX/DTX would also be available.

A test is performed at 408 to determine whether the frame classification variable on the low capacity channel, FCH_Rate indicates a classification of full rate. If so, the rate information may be used in the reclassification as indicated above, for example, at 410 such that the SCH_TX/DTX classification is changed from DTX indicating no transmission, to TX and erasure indicating that the data which should have been received was not received and should, for example, be retransmitted. If the FCH_Rate parameter is not at full rate, FCH power control can be immediately performed at 409. Power control is also performed after reclassification on both the high capacity channel at 409 and the low capacity channel at 405.

Figure 5:
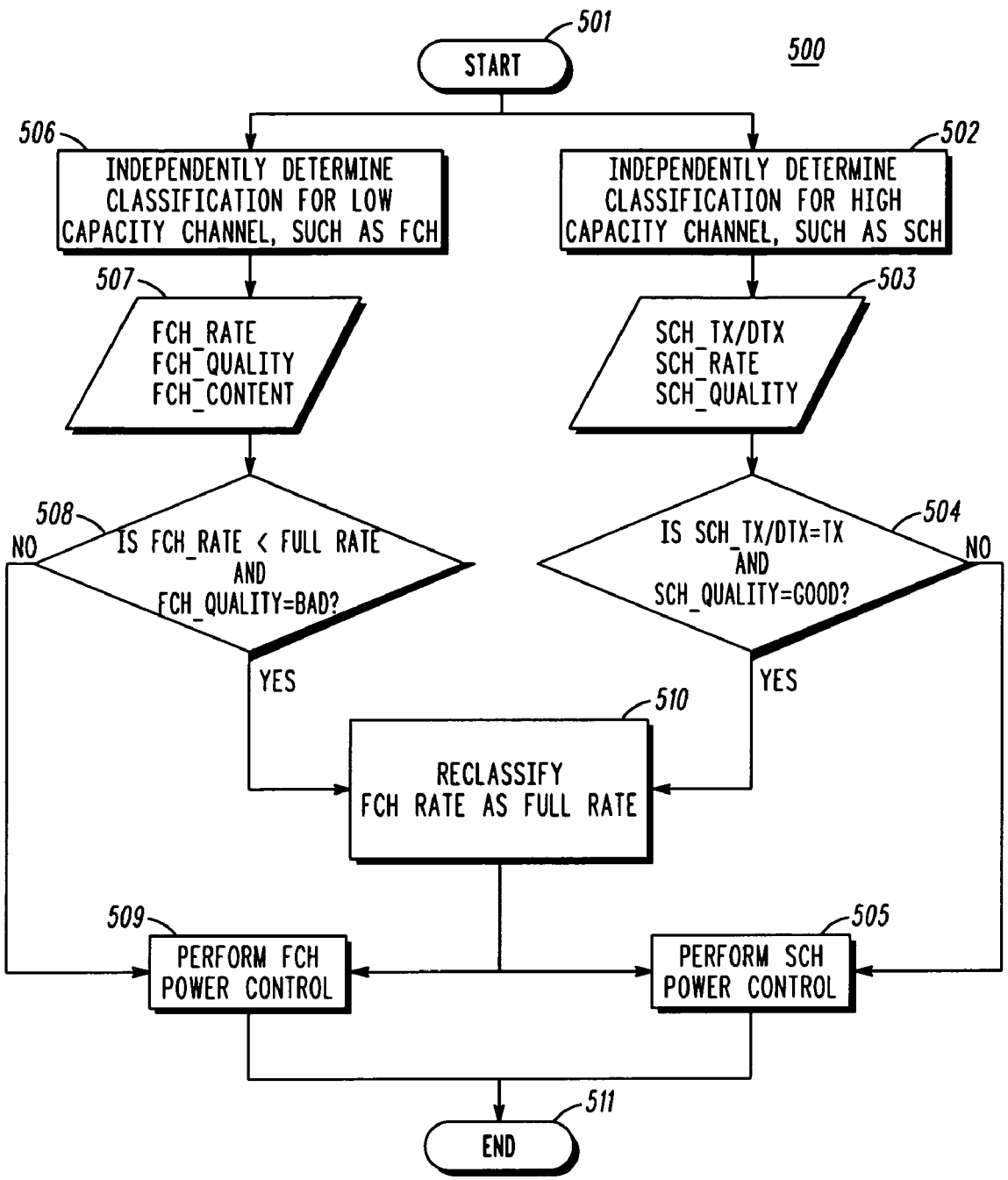
FIG. 5 is a flow chart depicting an exemplary frame classification method in accordance with another embodiment.

Frames associated with a low capacity channel such as an FCH channel, may be reclassified according to an exemplary procedure as illustrated in FIG. 5. Exemplary reclassification method 500 starts at 501 where, as described above, a high capacity channel, such as a SCH, and the low capacity channel are handled independently. At 502, for example, classifications for the high capacity channel are determined. In 503, information associated with the variables SCH_TX/DTX, SCH_Rate, and SCH_Quality, as determined at 502, are stored. A test is performed at 504 to determine whether the frame classification variables on the high capacity channel, SCH_TX/DTX indicates a classification of TX and SCH_Quality indicates a classification of GOOD. If not, power control is immediately performed at 505 in the usual manner. If variable SCH_TX/DTX does indicate a classification of TX and SC_Quality indicates a classification of GOOD, then a reclassification can occur at 510 of the low capacity channel. It should be noted that reclassification, for example, at 510 can make use of the one or more co-channel parameters as described in addition to the classifications associated with the low capacity channel as will be described immediately hereinafter. At 506, the low capacity channel classification can be independently determined. At 507, information associated with FCH_Rate, FCH_Quality, and FCH_Content, as determined at 506, can be stored. A test is performed at 508 to determine whether the frame classification variables on the low capacity channel FCH_Rate indicates a classification of less than full rate and FCH_Quality indicates a classification of BAD. If so, the information from the high capacity channel may be used in the reclassification at 510 such that the FCH_Rate classification is changed from a value less than Full Rate to Full Rate. If the FCH_Rate parameter is at Full Rate and FCH_Quality is GOOD, FCH power control can be immediately performed at 509. As noted above, power control is also performed after reclassification on both the high capacity channel at 509 and the low capacity channel at 505.

Figure 6:
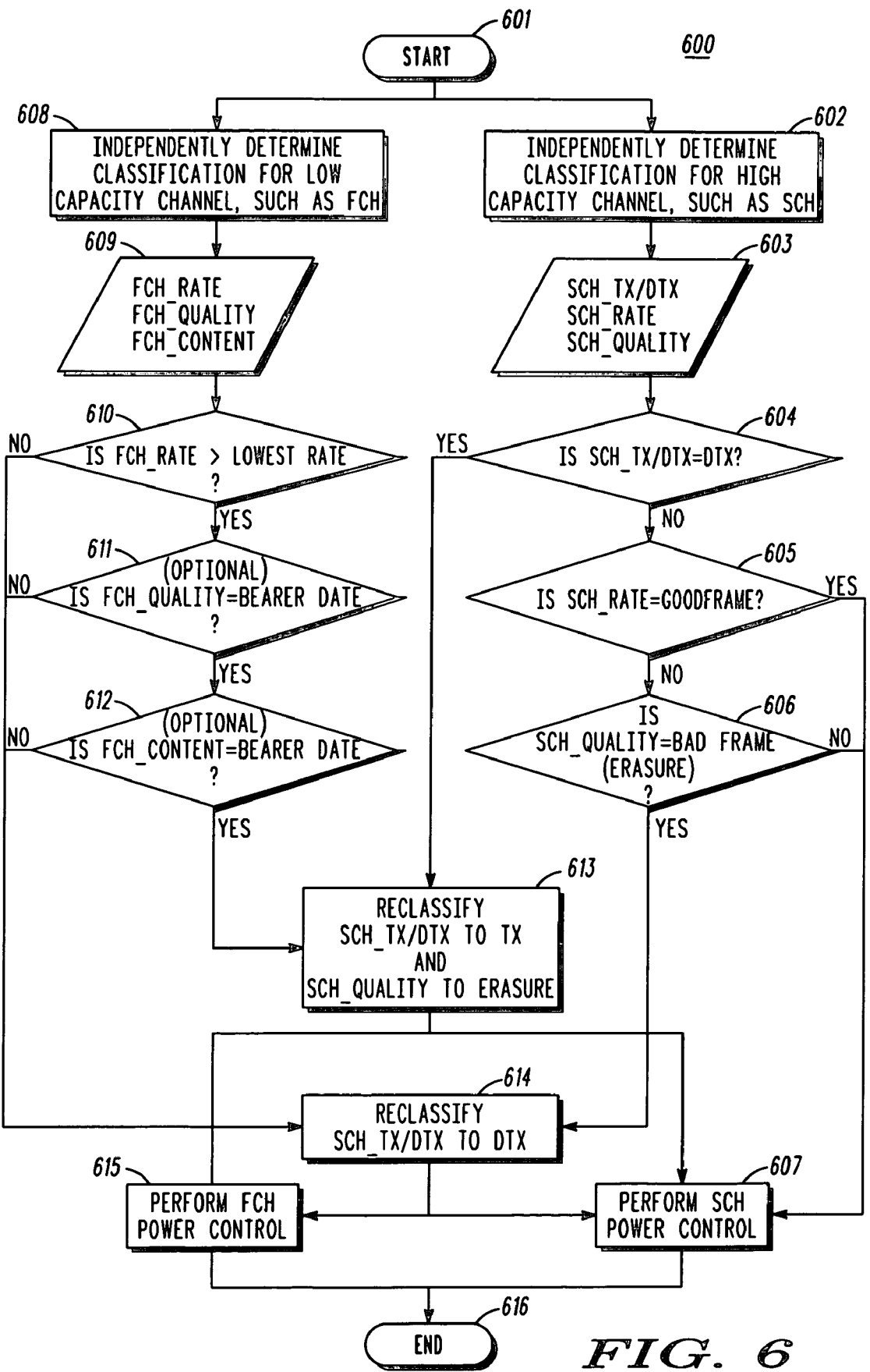
FIG. 6 is a flow chart depicting an exemplary frame classification method in accordance with still another embodiment.

In accordance with various alternative exemplary embodiments, particularly in reference to re-classification of high capacity channels based on the classification of low capacity, high reliability co-channels, optional re-classification procedures may be added to basic tests as better illustrated in FIG. 6. Exemplary method 600 starts at 601, where frames associated with high capacity and low capacity channels can be independently classified at 602 and 608. As noted above, various classification related variable can be established and values assigned thereto representing, for example, the present classification of a received frame on the particular channel. It will be appreciated by one of ordinary skill in the art that while present frame classification values may be of primary interest, historical frame classification data may also be kept and used in making determinations in accordance with the present invention. Thus, for example on an exemplary high capacity channel, such as an SCH channel, frame classification variables SCH_TX/DTX, SCH_Rate, and SCH_Quality values may be kept for the present frame and optionally for previous frames at 603. For an exemplary low capacity channel, such as an FCH channel, frame classification variables FCH_Rate, FCH_Quality, and FCH_Content values may be kept for the present frame at 609.

Referring now to the high capacity channel, a test can be performed at 604 for determining whether or not the present frame classification indicates there is active transmission on the high capacity channel. Thus, if the frame classification variable SCH_TX/DTX=DTX and the low capacity channel is at least determined to be transmitting, for example, at 610, by way of a positive test result that the frame classification variable FCH_Rate is at a value at least greater than the minimum transmission rate, then the present frame on the high capacity channel is re-classified at 613 from DTX to TX with the frame classification variable SCH_Quality being re-classified to Erasure. If, on the other hand, SCH_TX/DTX=TX, another test is performed at 605 to determine the state of frame classification variable SCH_Rate. If SCH_Rate=GoodFrame, power control on the high capacity channel can be performed at 607. If SCH_Rate is not equal to GoodFrame, then another test is performed at 606 to determine the state of frame classification variable SCH_Quality. If SCH_Quality=BadFrame (Erasure), then, based on information from the low capacity co-channel, the frame classification for the high capacity channel can be changed. SCH_TX/DTX can be changed to DTX rather than Erasure at 614 if results of low capacity channel frame classification tend to indicate that there is no active transmission. If frame classification variable SCH_Quality does not indicate BadFrame, then power control may be performed on the high capacity channel at 607. Once re-classification of the frame classification variable SCH_TX/DTX if performed at 614, then power control on both the high and the low capacity channels can be performed at 607 and 615 and the procedure may end at 616 until the next frame is classified.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the tendency of this application for patent, and all equivalents thereof, when interpreted in accordance with the breadth to which they are fairly, legally, and equitably entitled.

What is claimed is:

1. A method for reducing an erroneous frame classification associated with a communication in a radio access network (RAN), the method comprising:

classifying a first frame associated with the communication on a first channel having a first data rate and classifying a second frame associated with the communication on a second channel having a second data rate, wherein classifying includes classifying a Transmit/Discontinuous Transmit (TX/DTX) condition associated with each of the first frame and the second frame and wherein the first channel and the second channel are co-channels between a base station and a mobile station; and re-classifying the first frame from a first condition of the first frame to a second condition of the first frame based on the classifying the second frame of the second channel, and wherein the first condition being a DTX condition, and the second condition being at least one of a TX condition or an erasure condition.

2. A method according to claim 1, further comprising:

re-classifying the second frame from a first condition of the second frame to a second condition of the second frame associated with the communication based on the classifying of the first frame.

3. A method according to claim 2, further comprising facilitating an adjustment of a power level associated with the second channel based on the re-classifying the second frame.

4. A method according to claim 2, wherein the first condition of the second frame includes one or more of a rate parameter and a quality parameter and wherein the rate parameter includes a less than full rate value and the quality parameter includes a low quality value.

5. A method according to claim 1, wherein the first channel includes one of a high capacity channel and a low reliability channel and the second channel includes, respectively, one of a low capacity channel and a high reliability channel.

6. A method according to claim 1, wherein the RAN includes a cdma2000 RAN, and wherein the first channel includes a supplemental channel (SCH) and the second channel includes one of a fundamental channel (FCH) and a dedicated control channel (DCCH).

7. A method according to claim 1, wherein the classifying the first frame includes classifying a Transmit/Discontinuous Transmit (TX/DTX) condition associated with the first frame.

8. A method according to claim 1, wherein the first condition of the first frame includes a Discontinuous Transmit (DTX) condition and the second condition of the first frame includes a Transmit (TX) condition.

9. A method according to claim 7, wherein the second condition further includes an Erasure condition.

10. A method according to claim 1, further comprising facilitating an adjustment of a power level associated with the first channel based on the re-classifying the first frame.

11. A method for determining an erroneous frame condition associated with a wireless communication in a radio access network (RAN), the method comprising:
   determining a first parameter including one or more of: a Transmit/Discontinuous Transmit (TX/DTX) parameter, a first rate parameter, and a first quality parameter, the first parameter associated with a first frame on a first channel having a first data rate;
   determining a second parameter including one or more of: a second TX/DTX parameter, a second rate parameter, a second quality parameter, and a content parameter associated with a second frame on a second channel having a second data rate; and
   determining that a first condition associated with the first frame includes the erroneous condition and reclassifying the first condition associated with the first frame to a second condition associated with the first frame based on the second parameter associated with the second frame on the second channel,
   wherein the first data rate is greater than the second data rate and wherein the first channel and the second channel are co-channels between a base station and a mobile station.

12. A method according to claim 11, further comprising determining that a first condition associated with the second channel includes the erroneous condition and reclassifying the first condition associated with the second channel to a second condition associated with the second channel based on the first parameter.

13. A method according to claim 12, further comprising facilitating an adjustment of a power level associated with the second channel based on the reclassifying the first condition associated with the second channel.

14. A method according to claim 11, wherein the first channel includes a high capacity channel and the second channel includes a low capacity channel.

15. A method according to claim 11, wherein the RAN includes a cdma2000 RAN, and wherein the first channel includes a supplemental channel (SCH) and the second channel includes one of a fundamental channel (FCH) and a dedicated control channel (DCCH).

16. A method according to claim 11, wherein, if the TX/DTX parameter is equal to DTX and at least one of the conditions of: the rate parameter includes a value greater than a lowest rate value, the quality parameter indicates a good frame, and the content parameter indicates bearer data is satisfied, then the re-classifying the first condition associated with the first frame to a second condition associated with the first frame includes the first condition where the TX/DTX parameter is equal to DTX and the second condition where TX/DTX parameter is equal to TX and the quality parameter is an erasure.

17. A method according to claim 11, further comprising facilitating an adjustment of a power level associated with the first channel based on the re-classifying the first condition associated with the first frame.

18. An apparatus for reducing erroneous frame classifications associated with a communication with a radio access network (RAN), the apparatus comprising:
   an interface capable of supporting a portion of the communication on a first channel having a first data rate and a second channel having a second data rate less than the first data rate and wherein the first channel and the second channel are co-channels between a base station and a mobile station;
   a memory; and
   a processor coupled to the memory and the interface, the memory storing instructions for causing the processor to:
   determine a second parameter associated with a first frame on the second channel, the second parameter including one or more of: a second IX/DIX parameter, a second rate parameter, a second quality parameter, and a content parameter associated with the first frame on the second channel; and
   determine that a first classification condition associated with a first frame on the first channel is erroneous based on the second parameter,
   wherein the first classification condition associated with the first frame of the first channel is reclassified to a second classification condition based on the second parameter associated with the first frame on the second channel and wherein an adjustment of a power level associated with the first channel is facilitated based on the re-classification.

19. An apparatus according to claim 18, wherein the instructions further cause the processor to:
   determine a first parameter associated with the first frame on the first channel; and
   determine that a first classification condition associated with the first frame on the second channel is erroneous,
   wherein the first classification condition associated with the first frame on the second channel is reclassified to a second classification condition based on the first parameter and an adjustment of a power level associated with the second channel is facilitated based on the re-classification.

20. An apparatus according to claim 18, wherein the first channel includes a high capacity channel and the second channel includes a low capacity channel.

21. An apparatus according to claim 18, wherein the RAN includes a cdma2000 RAN, and wherein the first channel includes a supplemental channel (SCH) and the second channel includes one of a fundamental channel (FCH) and a dedicated control channel (DCCH).

22. An apparatus according to claim 18, wherein the first classification condition includes one of an first erasure condition and a discontinuous transmit (DTX) condition and the second classification condition includes, respectively, one of a discontinuous transmit (DTX) condition and a second erasure condition.

23. The apparatus according to claim 18 used in a mobile station wherein the interface is capable of coupling the mobile station and the RAN and supporting a downlink portion of the communication on the first channel and the second channel.

24. The apparatus according to claim 18 used in a base station wherein the interface is capable of coupling the base station and a Mobile Station (MS) associated with the RAN, the interface capable of supporting an uplink portion of the communication on the first channel and the second channel.

* * * * *